Patented Mar. 30, 1937

2,075,359

UNITED STATES PATENT OFFICE 2,075,359

INSECTICIDE

Paul Lawrence Salzberg and Euclid Wilfred Bousquet, Wilmington, Del., assignors to E. I. du Pont de Nemours & Company, Wilmington, Del., a corporation of Delaware No Drawing. Application October 16, 1930, Serial No. 489,232

13 Claims. (Cl. 167—22)

This invention relates to insecticides and more particularly to insecticides and insecticidal compositions comprised of the fluosilicates of organic bases.

Inorganic fluosilicates have been used as insecticides (J. Ind. Eng. Chem. 18, 572 (1926) and U. S. Patent 1,620,208). The high insecticidal properties of the fluosilicates of organic bases, and the marked advantages attending their use as insecticides, have not, however, insofar as we are aware, heretofore been recognized.

This invention has as an object a process of destroying parasites, particularly insects, and of rendering such materials parasite-proof as are subject to attack. A further object resides in the production of new parasiticides. Other objects will appear hereinafter.

These objects are accomplished by the following invention in which the fluosilicates of aliphatic, aromatic and heterocyclic bases are applied as insecticides as will more fully appear.

With respect to the general method of preparing our new insecticides, we prefer to react, below 60° C., the approximately 30% aqueous hydrofluosilicic acid of commerce and the organic base in equivalent or neutralizing amounts. Evaporation of the mixture at room temperature, preferably over sulfuric acid in a vacuum desiccator, yields the pure white crystalline organic fluosilicate. In some cases, it becomes practical to precipitate most of the organic fluosilicate from the aqueous reaction mixture by the slow addition of ethyl alcohol or acetone. More specific details of the preparation of these organic fluosilicates may be found in U. S. Patents 1,915,334 and 1,917,463.

The class of compounds with which the present invention is concerned possesses high insecticidal action both as contact insecticides for sucking insects and as stomach poisons for leaf-eating insects. These insecticides are, therefore, also valuable insect-proofing agents for textile or other material, as well as for foliage. Thus, these organic fluosilicates can be uniformly incorporated with materials, such as woolen articles by immersing the material in an aqueous solution of the organic fluosilicates and are thus useful in mothproofing. These fluosilicates may be applied for insecticidal purposes in any of the usual ways for the application of solid finely divided insecticidal materials, for instance, by dusting or by spraying suspensions or solutions thereof in water. They may be used alone or mixed with other insecticidal materials, or with inert materials or diluents designed, for instance, to improve their spreading properties or adherence. Suitable compositions for use in spraying are illustrated in the following examples.

Example 1

A 0.5% aqueous solution of di-n-butylamine fluosilicate with 0.5% fish oil soap was used as a spray on the black chrysanthemum aphis. Over 99% of the aphids were killed and there was no plant injury. Another very satisfactory spray solution may be made as above by using sulfonated oxidized petroleum oil as a spreader in place of the fish oil soap.

Example 2

A 0.5% aqueous solution of aniline fluosilicate with 0.5% fish oil soap, was used as a spray on the black chrysanthemum aphis. Over 99% of the aphids were killed, and there was no plant injury. Another very satisfactory spray solution may be made as above by using sulfonated oxidized petroleum oil as a spreader in place of fish oil soap.

Example 3

A 0.2% aqueous solution of pyridine fluosilicate with 0.5% fish oil soap was used as a spray on aphis rumicis. Ninety-nine per cent of the aphids were killed and there was no plant injury. Another very satisfactory spray solution may be made as above by using sulfonated oxidized petroleum oil as a spreader in place of fish oil soap.

Example 4

Five parts of piperidine fluosilicate and 5 parts of fish oil soap were diluted with water to make 1000 parts. This solution, when used as a spray, gave over 99% killing of black chrysanthemum aphids with no plant injury. Another very satisfactory spray solution may be made as above by using sulfonated oxidized petroleum oil as a spreader in place of fish oil soap.

Example 5

A 0.25% aqueous solution of p-phenethyl aminothiazole fluosilicate with 0.5% fish oil soap was used as a spray on the black chrysanthemum aphis. Over 99% of the aphids were killed and there was no plant injury. Another very satisfactory spray solution may be made by using sulfonated oxidized petroleum oil as a spreader in place of fish oil soap.

These organic fluosilicates are easily incorporated into materials to be protected against insect attack by immersing goods in an aqueous solution of the fluosilicate. The following examples illustrate the use of these materials as moth-proofing agents.

Example 6

The goods are immersed in a 1% aqueous solution of di-n-butylamine fluosilicate and dried. Such materials as wool, fur, hair, hide, felt, and the like, may be impregnated. The goods after treatment are moth-proofed without detrimental effect on the color or physical characteristics.

Example 7

The goods are immersed in a 1% aqueous solution of aniline fluosilicate and dried. Such materials as wool, fur, hair, hide, felt, and the like, may be impregnated. The goods after treatment are moth-proofed without detrimental effect on the color or physical characteristics.

Example 8

The goods are immersed in a 1% aqueous solution of quinoline fluosilicate and dried. Such materials as wool, fur, hair, hide, and the like, may be impregnated. The goods after treatment are moth-proofed without detrimental effect on color or physical characteristics.

Examples of other aliphatic fluosilicates, in addition to the di-n-butylamine fluosilicate mentioned are: n-butylamine fluosilicate, tri-n-butylamine fluosilicate, benzylamine fluosilicate, triethanolamine, fluosilicate, b-amino-ethyl-aniline fluosilicate, and ethylene diamine fluosilicate.

Among the insecticides selected from the class of aromatic fluosilicates in addition to the aniline fluosilicate referred to, there may be mentioned those obtained by reacting amino-naphthalenes, amino-diphenyls or amino-anthracenes, with hydrofluosilicic acid.

In addition to the three heterocyclic fluosilicates mentioned in the examples, the following heterocyclic fluosilicates may be mentioned: quinoline, nicotine, picoline, lutidine, collidine, isoquinoline, quinaldine, naphthoquinaldine, acridine and carbazole. The fluosilicates of crude coal tar bases may also be used. These bases may be partially or wholly hydrogenated as exemplified by piperidine, or by pyrrolidine, or alkyl pyrrolidines.

The fluosilicates of organic bases, which constitute the new insecticides herein referred to, are in general white crystalline solids readily soluble in water. They melt at fairly high temperatures, although rather volatile around 100° C., and some of them sublime. Analyses of these organic fluosilicates show that they possess the general formula $R_2.H_2SiF_6$, where R represents the organic base containing one basic nitrogen atom. While it is to be understood that the present invention is not dependent or limited by the accuracy of the formulae used to represent these insecticides, it may be noted that where the organic base contains a plurality of basic nitrogen atoms in the molecule, the formula may be more generally expressed as

$$R^2_x \cdot H_2SiF_6$$

wherein R is a basic nitrogen compound, and $x$ the number of basic nitrogen atoms utilized for the formation of the fluosilicates.

The present invention comprehends the reaction products of all organic bases with $H_2SiF_6$ which possess insecticidal properties. More particularly, the invention is concerned with those reaction products soluble in water for the production of aqueous insecticidal solutions. Thus, among the fluosilicates of aliphatic bases, the fluosilicates of alicyclic amines, such as cyclopentylamine or cyclohexylamine, are included as well as the alkyl, alkylene, and aralkyl amines. By the term aliphatic bases, we mean to include also molecules having other functional groups besides the basic nitrogen atom, such as amino nitriles, mono-B-hydroxy ethyl amine, and amino acids. It is to be understood, therefore, that the term "aliphatic" as used in the claims to designate our new insecticides consisting of the fluosilicates of organic aliphatic bases, refers to the fact that at least one of the groups attached to the basic nitrogen atom or atoms is an aliphatic organic group, and that the term aliphatic includes those organic groups which are only partially aliphatic, but which are joined to the nitrogen atom through the aliphatic constituent of the organic group. Thus in the general formula $R_2.H_2SiF_6$, wherein R is an amino compound or group having a single basic nitrogen atom, this group may be represented as

$$R'.N.R'$$
$$\phantom{R'.N.}R'$$

in which one of the R' values is an aliphatic organic residue which, as noted above, may consist of an alkyl group, an alkylene group, an aralkyl group, or an alicyclic group. The remaining R' constituents may represent hydrogen or any one of the groups referred to in connection with the first mentioned value of R'. Similarly, in the fluosilicates of organic aromatic bases, one R' represents an aryl radical while the remaining R' constituents may represent hydrogen, alkyl, alkylene, aryl, aralkyl, alicyclic, or other organic residue. By the term aromatic bases, we mean to include also molecules with other functional groups besides the basic nitrogen atom such as o-, m-, and p-nitroaniline, o-, m-, and p-hydroxy-aniline, nitro-diphenyl amines, etc. We also mean to include secondary and tertiary amines as well as primary amines. The heterocyclic bases which may be reacted with hydrofluosilicic acid for the production of our new insecticides are those which contain at least one nitrogen atom as a member of the heterocyclic ring. The term heterocyclic also includes molecules having other functional groups, or other hetero atoms besides the basic heterocyclic nitrogen atom, such as morpholines, thiomorpholines and thiazoles. Heterocyclic compounds having more than one basic nitrogen atom, such as piperazines, naphthyridines, and dipyridyls, may be used.

For insecticidal purposes it is not necessary to prepare and isolate the compounds. The organic base and hydrofluosilicic acid may be merely mixed in aqueous solution in the theoretical quantities and then diluted and mixed with a suitable spreader. Any concentration which is not injurious to the host receiving the insecticidal mixture may be used. The organic fluosilicates herein disclosed, and compositions thereof, may also be used in the solid or powdered form for protecting materials against insect attack.

The organic fluosilicates of the present invention are easily prepared white, crystalline, non-inflammable solids, soluble in water, practically odorless and non-corrosive. The solubility of these compounds in water is highly advantageous because of the economy and convenience in applying the solution as a spray as compared with the similar application of insecticides not soluble in water. These compounds are particularly effective as insecticides because they function not only as a contact insecticide, but also as a stomach poison. Furthermore, they possess the highly important property of not burning delicate foliage.

As many apparently widely different embodiments of this invention may be made without departing from the spirit and scope thereof, it is to be understood that we do not limit ourselves to the specific embodiments thereof except as defined in the appended claims.

We claim:

1. An insecticide comprising a fluosilicate of an organic base.
2. An insecticide comprising a water solution of a fluosilicate of an organic base.
3. An insecticide comprising a fluosilicate having the probable general formula of $$R\frac{2}{x} \cdot H_2SiF_6$$

wherein R is an organic basic nitrogen compound, and $x$ the number of basic nitrogen atoms in each molecule of the basic nitrogen compound which are utilized for the formation of the fluosilicate.

4. An insecticide comprising the reaction product of hydrofluosilicic acid with an organic base.
5. An insecticide comprising a water solution of the reaction product of hydrofluosilicic acid with an organic base.
6. An insecticide comprising the reaction product of equivalent amounts of hydrofluosilicic acid and an organic base.
7. An insecticide comprising a fluosilicate of an organic aliphatic base.
8. An insecticide comprising a fluosilicate of an organic aromatic base.
9. An insecticide comprising a fluosilicate of an organic heterocyclic base, containing at least one nitrogen atom as a member of the heterocyclic ring.
10. An insecticide comprising aniline fluosilicate.
11. A moth-proofing solution comprising triethanolamine fluosilicate.
12. A moth-proofing composition comprising a solution of a fluosilicate of an organic base.
13. An insecticide comprising the silicofluoride of an alkaloid.

PAUL LAWRENCE SALZBERG.
EUCLID WILFRED BOUSQUET.